United States Patent
Posey et al.

(10) Patent No.: US 6,607,823 B2
(45) Date of Patent: Aug. 19, 2003

(54) HEAT SEAL COATING AND COATED FILM

(75) Inventors: Robert Giles Posey, Duncan, SC (US); Charles David Carlson, Jr., Columbus, NC (US); Jeffrey R. Rounsley, Taylors, SC (US)

(73) Assignee: Mitsubishi Polyester Film, LLC, Greer, SC (US)

( * ) Notice: Subject to any disclaimer, the term of this patent is extended or adjusted under 35 U.S.C. 154(b) by 0 days.

(21) Appl. No.: 09/946,399

(22) Filed: Sep. 5, 2001

(65) Prior Publication Data

US 2002/0114890 A1 Aug. 22, 2002

Related U.S. Application Data

(60) Provisional application No. 60/230,638, filed on Sep. 7, 2000.

(51) Int. Cl.$^7$ ............................ B32B 27/08; B32B 27/36; B32B 31/14; B32B 31/24; B32B 31/30
(52) U.S. Cl. ........................ 428/336; 428/346; 428/347; 428/349; 428/355 R; 428/480; 428/483; 528/293; 528/295; 156/244.11; 156/244.23; 156/297; 156/299; 427/372.2; 427/384; 427/385.5; 427/393.5
(58) Field of Search ........................... 428/480, 483, 428/334, 336, 335, 343, 346, 347, 349, 355 R; 427/402, 407.1, 412.1, 412.5, 372.2, 384, 385.5, 383.5; 156/244.11, 244.23, 297, 299; 528/293, 295, 294

(56) References Cited

U.S. PATENT DOCUMENTS

| 4,299,933 | A | * | 11/1981 | McConnell et al. | ......... | 252/176 |
| 4,304,901 | A | * | 12/1981 | O'Neill et al. | ................ | 522/85 |
| 4,493,872 | A | | 1/1985 | Funderburk et al. | | |
| 4,598,142 | A | * | 7/1986 | Hilbert et al. | ............... | 528/295 |
| 5,605,764 | A | * | 2/1997 | Miller et al. | ................ | 428/480 |
| 5,750,605 | A | * | 5/1998 | Blumenthal et al. | ........ | 524/221 |

FOREIGN PATENT DOCUMENTS

| GB | 1078813 | | 8/1967 |
| WO | WO9619333 | | 6/1996 |
| WO | WO 96/37569 | * | 11/1996 |
| WO | WO0153080 | | 7/2001 |
| WO | WO0154886 | | 8/2001 |

OTHER PUBLICATIONS

Schimtz, Peter et al., "Films." Ullmann's Encyclopedia of Industrial Chemistry, 5th Ed., vol. A11, pp. 85–110.*
Mitsubishi Polyester Film, LLC—Product Bulletin for 26WS—Heat–Sealable Film—Feb., 1999 : [Uses a coextruded layer to obtain heat seal using heat seal layer formulation as discussed in specification as prior art.].

* cited by examiner

Primary Examiner—Vivian Chen

(57) ABSTRACT

The present invention provides a coated polymer film having heat seal properties. The heat seal coating includes a propylene diol copolyester. Preferably, the copolyester is formed from 1,3-propane diol, isophthalic acid and a sulfomonomer. A method of heat sealing using this coated film is also disclosed.

25 Claims, No Drawings

HEAT SEAL COATING AND COATED FILM

This application claims the benefit of U.S. Provisional Application No. 60/230,638, filed Sep. 7, 2000.

BACKGROUND OF THE INVENTION

1. Field of the Invention

The present invention relates generally to a coated polyester film having a heat seal capability. More specifically, it is related to a water dispersible copolyester coating suitable for application to polyester film that provides a durable, strong, moisture resistant heat seal and other desirable properties. The methods of coating and of forming a heat sealable film are also disclosed.

2. Description of Related Art

Heat sealable films are known in the art. Such films are useful for many applications including lamination and packaging of food materials. Lamination of important documents and other objects is well known in the art. Menus, ID cards and other objects can be protected by such lamination films. Lamination films are typically heat sealed to themselves or to another substrate to form a protective pouch. These heat seals typically are of a strength that the film is destroyed before the seal will release. This gives these seals a tamper-resistant quality that is useful in many applications. With regard to packaging, many prepared foods are packaged in paper or plastic-based trays, with a clear film heat sealed across the top of the tray to protect the food within while leaving it visible to the consumer and easily removable or perforated for cooking and serving. In both such applications, it is desirable for the film to have a number of properties. It should be safe for food contact, for those applications in which edible items will be in proximity to the coating. It is preferably clear or transparent. It must be stable even after heat seal, and preferably after cold storage and heating. It should form a good heat seal, preferably under typical conditions and using standard equipment. It should be able to form a heat seal with itself, the intended tray or other material to which it will be sealed, preferably without use of adjunct adhesives. It is preferably moisture resistant so as to avoid degradation by contact with moisture in or steam released by the food or other contents. It is preferably durable under normal packaging, transport and storage conditions. For many applications, it should also be releasable by the end user without excess force (a "weld seal", which is not stronger than the film itself). For other applications, it is desired that the film rip before the heat seal releases (a "destruct seal"). The heat seal film should optimally be cost effective to manufacture, and should minimize the use of organic solvents or other potentially environmentally hazardous compounds in its manufacture and use, to the extent possible. Reclaimability is also beneficial. Coatings adapted for in-line application are also desirable. A film providing a combination of these benefits is desirable.

Water-dispersible copolyester coatings for use on polyester film are also known. See, e.g., U.S. Pat. No. 4,493,872 to Funderburk et al. In addition, films formed of polytrimethylene isophthalate have been represented to have heat seal capabilities, in the absence of adhesives or coatings.

BRIEF SUMMARY OF THE INVENTION

Accordingly, it is an object of the present invention to provide a heat seal coating suitable for application to a base polymer film.

It is a further object of the present invention to provide a heat seal coating that is highly moisture resistant.

It is another object of the present invention to provide a heat seal coating that is substantially free of streaks and smears, particularly when applied to a base polymer film.

It is yet another object of the present invention to provide a heat seal coating that is water dispersible.

It is another object of the present invention to provide a heat seal coating that also offers good adhesion to metals, inks and adhesives.

The present invention provides a heat seal coated film comprising:

a polyester film layer; and a heat seal coating thereon, wherein said heat seal coating comprises a copolyester formed from components including isophthalic acid, the sodium salt of 5-sulfoisophthalic acid and propylene diol.

DETAILED DESCRIPTION OF THE INVENTION

The present inventors have surprisingly found that excellent heat seal properties are provided by a coating that includes a propylene diol-based copolyester binder. The selection of binder has been found to be critical to the optimal heat seal results achieved by various coatings of this invention.

The heat seal coating of the present invention preferably includes a propylene diol-based copolyester. Preferably, such copolyester is a water soluble copolyester. More preferably, the copolyester is formed from isophthalic acid and the sodium salt of 5-sulfoisophthalic acid in approximately a 9:1 ratio, and equal parts of 1,3-propane diol. This water soluble copolyester differs from the copolyester as disclosed in U.S. Pat. No. 4,493,872 to Funderburk et al. (the disclosure of which is incorporated herein by reference in its entirety) primarily in the use of a propylene glycol, preferably a propane diol, more preferably 1,3-propane diol. Copolyesters explicitly disclosed in the Funderburk et al. patent, namely ethylene glycol based copolyesters, were first evaluated for vacuum metalization applications and are shown in the examples to have inferior heat seal capability versus the object of this invention. They are also believed to have inadequate resistance to moisture, among other things. Nonetheless, the inventors surprisingly found that a propylene diol based copolyester did have excellent moisture resistance and other desirable properties for a heat seal coating. Without intending to be bound by theory, it is believed that propylene diols, having an odd number of carbon atoms, are conformationally more stable than glycols having even numbers of carbons. This may provide additional stability and moisture resistance to the resulting copolyester. Similarly, the increased "hydrocarbon" character imparted by the longer diol chain may also impart improved properties to a propylene diol-based copolyester.

Thus, the preferred copolyester is the condensation product of the following monomers or their polyester forming equivalents: isophthalic acid, a sulfomonomer containing an alkali metal sulfonate group attached to a dicarboxylic aromatic nucleus and a propylene diol. Optionally, an aliphatic dicarboxylic acid of the formula $HOOC(CH_2)_n COOH$, where n is about 1 to about 11, can also be employed as a monomer therein. Substitutes for the isophthalic acid preferably include other aromatic difunctional monomers (e.g., DMT, DM-2,6-NDC, etc.). However, highly preferred DMI-based copolyesters are usually amorphous and crystallize very slowly, if at all, making them easy to disperse in water, unlike some DMT-based copolyesters which tend to crystallize rapidly. An optimal copolyester is made up of about 90 mol percent isophthalic acid, about 10 mol percent of the sodium salt of 5-sulfoisophthalic acid and about 100 mol percent 1,3-propane diol.

It is important to note, however, that the preferred percentages of sulfomonomer, isophthalic acid and aliphatic dicarboxylic acid that can be employed are far broader in the context of the present invention. For example, in the context of the present invention, isophthalic acid is preferably about 40 to about 98 mol percent (more preferably about 50 to about 95 mol percent), aliphatic dicarboxylic acid is preferably about 0 to about 50 mol percent (more preferably about 5 to about 20 mol percent), and the sulfomonomer is preferably about 2 to about 20 mol percent (more preferably about 5 to about 15 mol percent). In addition, the sulfomonomer group of the present invention is not limited to an alkali metal sulfonate group. Any sulfomonomer in which a sulfonate group is attached to a dicarboxylic nucleus is preferred for use herein. Propylene diol may be used either alone or in combination with other diols or mixtures thereof. The copolyesters of the present invention preferably include at least about 10 mol percent propylene glycol, alternately at least about 25 mol percent propylene glycol, and further alternately at least about 50 mol percent propylene glycol.

Films coated with a heat seal film containing this copolyester possess the added benefit of excellent adhesion to inks, adhesives and metals. Such improved adhesion has previously been disclosed in conjunction with other sulfomonomer-based copolyester coatings. However, given the differing structure and performance of the compounds of the present invention, it was not known whether such improved adhesion would result.

The copolyester is preferably present at about 1 to about 30 percent by weight of the coating solution, and in an alternate preferred embodiment, it is present at about 1 to about 6 percent by weight of the coating solution.

Conventional additives that are known in the art can be included in the heat seal coatings of the present invention. For example, pigments, other colorants, stabilizers, antistatic agents, adhesion promoters, antioxidants, delusterants, fillers, plasticizers, slip agents and the like can be included in the heat seal coatings of the present invention.

The resulting coating, when applied to base polymer film, has excellent clarity and freedom from streaking. This is important for many packaging applications in which the enclosed product or another packaging element is visible through the film. The preferred coatings of the present invention do not measurably affect the inherent clarity of the base film.

The ingredients of the heat seal coating are preferably formulated as a dispersion in water or a water-containing solvent. Alternatively, alcohols or other suitable organic solvents can be employed, alone or in combination with water. The solids level is preferably up to about 50 weight percent, alternatively about 0.01 to about 30 weight percent, more preferably about 15 to about 20 weight percent.

The preferred solids level of the heat seal coating, as it is applied to the base polymer film, is a level sufficient to yield a final dry coating thickness within the range of about 0.02 microns to about 1 micron, alternatively about 0.1 microns to about 0.3 microns. The optimal coating thickness is about 0.2 microns. Preferred thicknesses of about 10 times those of known in-line coated copolyester coatings have been found to exhibit optimal results. In addition, the heat seal coating of the present invention is suitable for application at much higher levels, and for extrusion or coextrusion as a separate self-supporting web.

The coating compositions of the present invention can be formulated by simply combining the desired coating components. Agitation may be used to insure an even dispersion or solution. A benefit of the present invention is the greatly reduced levels of dimers, crystallization and other sources of particulate matter present in coatings of the present invention as contrasted with other known copolyester coatings. Filtration of the aqueous dispersion is typically not necessary.

The reclaim (no excessive yellowing or deterioration in physical properties when coated film scrap is mixed with fresh polymer and re-extruded) and recycling characteristics of coated polymer film are important. The ability to reuse scrap film, instead of disposing of it, reduces material and waste disposal costs and minimizes unnecessary waste. It has been found that coatings containing the preferred copolyester of the present invention have excellent reclaim characteristics. Water-based copolyesters are preferred for health and safety reasons, due the elimination or reduction of potentially hazardous solvents.

The heat seal coating of the present invention can facilitate sealing of the coated film to many substrates, as well as to itself. For lamination applications, the film is typically sealed with a "destruct" seal to itself. The coated film of the present invention eliminates a separate coating step for laminators. For food packaging applications, a common substrate is polystyrene. Many disposable frozen dinner trays and the like are formed from polystyrene, and it is preferred that the heat seal coating of the present invention be adapted for sealing to polystyrene. The propylene diol-based coating has been found to have excellent adhesion to polystyrene as well as APET (amorphous polyethylene terephthalate), coated paper, at moderate seal temperatures and CPET (crystalline polyethylene terephthalate) trays at higher temperatures.

Seal testing is typically performed on self-seals—wherein the coated film is sealed to itself. For moisture resistance testing, a bead of water is placed along the self-seal and allowed to stand. The force necessary to separate the film faces along the seam is then measured and quantified. Typically, a 3 mil film is used for such bond testing. A force of about 4 pounds per inch is then applied.

Optionally, particularly in the context of food packaging, the heat seals of the present invention are also preferably able to withstand freezing temperatures for extended periods. This permits them to be used in applications requiring freezing, such as frozen dinners and other frozen food products. The heat seal coatings of the present invention provide heat seals having such resistance to freezing temperatures. Such films are typically able to withstand normal shipping, retail distribution and freezer storage by the end consumer.

Base Film

For the preferred uses of the coating and method of the present invention, a polymer film substrate is most useful. It provides a lightweight, substantially transparent, inexpensive, disposable or recyclable substrate that accommodates many of the end uses of heat sealable film. In addition, the coated polymer film can also easily be laminated by adhesives or heat bonding or mechanical fasteners to various other substrates, to give them heat seal properties.

The heat seal coatings and coating methods of the present invention are applicable to any polymeric film capable of acting as a substrate for a heat seal coating. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, of mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art.

In addition, the base polymer film may be a polymer laminate. Such laminates include polymer—polymer laminates like polyester-polyolefin or polyester-adhesive-polyolefin, polymer-metallic laminates such as polyester-aluminum, or polymer-paper or polymer-adhesive-paper laminates. Coated polymer films or film laminates can also be used. Primer coatings used to enhance wet-out or coating adhesion are preferred examples of such coatings.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with monoaxial orientation being less preferred. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C.

Coating Methods

In-line coating of the base polymer layer, in which the coatings are applied during the film manufacturing process and before it is heat-set, is the preferred method for use of the coatings disclosed herein. Typically, the base polymer film is coated after corona treatment and prior to the stretch orientation of the film as described in British Patent No. 1,411,564, or coated between drawing steps (when biaxially oriented film is produced) as taught by U.S. Pat. No. 4,571,363, or coated post-draw as taught by U.S. Pat. No. 3,322,553.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

While surface modification of the base polymer film prior to coating is not required, it has been found that better results are obtained if the surface or surfaces of the base polymer film are modified before application of the coatings of the present invention. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 1.0 watt per square foot per minute is typically sufficient to achieve the desired results. In addition, primer or other intermediate layers can optionally be used between the polymer film and the heat seal coating.

Sealing Methods

In light of the foregoing, preferred methods of forming heat sealable polymer film and of heat sealing polymer film are provided herein. Preferably, one or both faces of a base polymer film are coated with a heat seal coating of the present invention. Optionally, if only one face is coated with the heat seal coating of the present invention, this coating can occur before, after or at the same time the opposite face of the base polymer film is coated with an alternate coating. The heat seal coating is preferably not overcoated with another coating. Such a top coating could limit the ability of the heat seal coating to function.

The coated polymer film is then aligned with the substrate to which it is to be heat bonded. While it will typically be a separate type of material (often a more rigid material), this substrate may be another film or another portion of the same film. Heat (and optionally or alternatively pressure) is then applied to the coated polymer film. Preferably, heat of about 110 to about 170 degrees Celsius is applied, for a duration of about 0.5 to about 10 seconds. At greater than about 170 degrees Celsius, some film distortion is typical. However, optimal heat and timing will be based on the film and the substrate to be used, and the desired nature of the resulting bond. The film gauge (i.e. heat transfer rate) and the sealing process speed are key parameters in this regard. Pressure of about 20 to about 60 psi (typically 40 psi) can be applied during this period, either along with or instead of the heat.

The resulting seal is preferably a weld seal or a destruct seal. Preferred film thicknesses are about 200 gauge or greater to result in a destruct seal of desired strength of lamination applications. In addition, lamination films are typically thick films in this range. 300 gauge film is preferred. However, thinner films are viable for various lamination applications, and a variety of film thicknesses can be used with other heat seal applications of the present invention.

Lamination

Coated films of the present invention can also be used to form film laminates. Molten resins can be extruded onto the coated film. The heat of the molten resin will thermally activate the heat seal coating of the present invention, causing a strong lamination bond between the film on which the heat seal coating had been applied, and the film formed from the newly extruded resin. While other additives and adhesives, as well as pre-treatments and corona treatments, can be used in this process, in preferred embodiments of this invention a successful laminate can be formed without their use. The use of a pre-coated film provides a cleaner, less complex, less expensive lamination process. Moreover, it enables an extrusion lamination process, where adhesives would typically melt in contact with extruded molten resins. The preferred destruct bond formed with the coated films of the present invention provides a strong, permanent laminate structure. Any compatible resins may be used in this process. For example, resins such as polyethylene, vinyl acetate and various copolymers including those components can be used in this lamination process.

EXAMPLES

The following Examples demonstrate various aspects of certain preferred embodiments of the present invention, and are not to be construed as limitations thereof. The formulations of the individual samples are shown in the charts below. In each example, the listed coating samples were formulated and coated in-line on biaxially oriented polyester film. Specifically, heat set PET film was coated in-line between draw steps on biaxially oriented polyester film with the following sample coatings. As in all of the following examples, heat seal performance was tested by Instron testing on heat sealed ½ inch wide strips with a crosshead speed of 12 inches per minute. Furthermore, polymerization of the propane diol-based copolymer was performed according to the following steps (other polymers were formed in equivalent fashion):

A 2-liter, stainless steel reaction vessel, equipped with an anchor stirrer, a thermocouple to measure the temperature of the vessel contents, an 18 inch Claisen/Vigreaux distillation column with a condenser and receiver flask, an inlet port, and a heating mantle was preheated to 190° C., swept with nitrogen, and charged with: dimethyl isophthalate (1009.5 g), dimethyl 5-sulfoisophthalate, sodium salt (171.1 g), 1,3-propanediol (1011.0 g), potassium carbonate (2.0 g), Fascat 4100 (1.0 g), and tetrabutyltitanate (0.15 g). The mixture was stirred and heated while methanol distilled from the vessel. During the distillation, the vessel temperature was gradually raised to 250° C. When the contents of the vessel reached 235° C., the distillation column was replaced with a gooseneck vapor takeoff with a receiver, and an aspirator vacuum was applied. The vacuum was reduced from atmospheric pressure to about 20 mmHg over one hour. At that time, the vacuum system was switched to a pump to reduce the vacuum to 0.1 mmHg or less. The stirrer speed was reduced, and an initial stirrer motor amperage reading was taken. The viscosity of the polymer (and thus its molecular weight) was controlled by allowing the polycondensation reaction to proceed to a predetermined change in stirrer motor amperage. After the desired change in amperage was attained, nitrogen was used to pressurize the vessel and to force the molten polymer out of the bottom plug of the vessel and into an ice water quench bath.

Examples 1–12

Aqueous dispersion coatings of varying percent solids and containing the copolymer of the present invention (Examples 1–7) were coated on polyester film which was drawn to a final thickness of 3 mil. The copolymer of Examples 1–7 was formed from 90 mol % isophthalate, 10 mol percent 5-sulfoisophthalate and 100 mol percent 1,3-propanediol. Coating consumption was monitored during application of the coating and dry coating weight of each sample was determined in units of pounds of copolymer per million square feet of film (lb/Msf). Each sample was then sealed to itself using a commercially available bar sealer with seal temperature set to 248 F. (120 C.) with a pressure of 40 psi for a 10-second dwell time. The force required to pull the sealed film apart was recorded by the Instron data acquisition system and displayed below in Table 1. It should be noted that in Examples 1–5 the film tore (destruct bond) during the testing in all cases and the load reported represents the highest recorded load at film destruct.

Comparative Examples 8–12 are examples using known EG-based coatings (100 mol % ethylene glycol is substituted for the 100 mol % 1,3-propanediol) and correspond directly in dry coating weight to Examples 3–7 above and demonstrate the enhancements of the present invention. None of the samples in this series tore with a destruct bond.

Examples 13–17

The copolyester coating of Examples 1–7 was manufactured using base polymer of varying molecular weight. Molecular weight was qualitatively obtained as by measuring the increase in current required (measured with respect to the base current at the start of polymerization) to agitate the polymer during manufacture. The 20% solids copolymer dispersion coatings were applied to PET film as in Examples 1–12. As shown in the Table 2 below, destruct seals were obtained for all molecular weights investigated.

TABLE 1

| Sample # | % solids | Dry laydown (lb/Msf) | Seal strength (lbf/in) |
|---|---|---|---|
| 1 | 20 | 130.5 | 3.06 (D) |
| 2 | 16 | 116.8 | 3.18 (D) |
| 3 | 12 | 64.6 | 3.28 (D) |
| 4 | 8 | 52.3 | 2.97 (D) |
| 5 | 4 | 26.1 | 3.42 (D) |
| 6 | 2 | 11.5 | 1.48 |
| 7 | 1 | 6.15 | 0.62 |
| 8 | 12 | 73.8 | 2.20 |
| 9 | 8 | 52.3 | 1.26 |
| 10 | 4 | 24.6 | 0.54 |
| 11 | 2 | 9.84 | 0.46 |
| 12 | 1 | 6.16 | 0.53 |

TABLE 2

| Sample # | Mol Wt (delta amps) | Dry laydown (lb/Msf) | Seal strength (lbf/in) |
|---|---|---|---|
| 13 | 0.5 | 105 | 3.86 (D) |
| 14 | 1.0 | 110 | 3.57 (D) |
| 15 | 1.5 | 117 | 3.84 (D) |
| 16 | 3.5 | 117 | 3.65 (D) |
| 17 | 4.0 | 129 | 3.88 (D) |

Note: "D" indicates the film tore prior to coating separation (destruct bond)

Examples 18–21

The amount of 5-sulfoisophthalic acid (5-sim) was varied in the polymer recipe of Examples 1–7, reducing the 10 mol percent to the indicated levels and increasing the amount of isophthalate in proportion. The resulting polymer was dispersed in water to make aqueous coatings which were applied to PET film as described above. The dispersability of the copolymer becomes more difficult as the level of 5-sim decreases thereby increasing the viscosity of the resulting coating and limiting its application. The results are shown in the Table 3.

TABLE 3

| Sample # | % 5-sim | Mol Wt (delta amps) | Dry laydown (lb/Msf) | Seal strength (lbf/in) |
|---|---|---|---|---|
| 18 | 9.0 | 4.5 | 124.1 | 3.57 (D) |
| 19 | 8.0 | 2.0 | 118.2 | 4.22 (D) |
| 20 | 8.0 | 4.5 | 94.5* | 3.82 (D) |
| 21 | 7.0 | 4.5 | 35.0* | 1.18 |

Note: "D" indicates the film tore prior to coating separation (destruct bond)
*: Dry laydown was limited due to high viscosity of resulting coating at low 5-sim levels. While low 5-sim levels are not preferred for use in the present invention, such levels may be acceptable based on the end use and other components of the coating.

Examples 22–24

In this series of tests, varying amounts of ethylene glycol (EG) were substituted for PDO in the recipe of Examples 1–7, with the ratio of EG/PDO recorded. More specifically, the resulting dispersed coatings were applied to PET film as above. The results shown in Table 4 indicate that substitution of EG for PDO does not apparently adversely impact the seal strength of the coating, but that the dispersability of the copolymer becomes more difficult as the level of PDO decreases thereby increasing the viscosity of the resulting coating and limiting its application.

TABLE 4

| Sample # | EG/PDO (%/%) | Dry laydown (lb/Msf) | Seal strength (lbf/in) |
|---|---|---|---|
| 22 | 25/75 | 104 | 3.35 (D) |
| 23 | 50/50 | 104 | 3.48 (D) |
| 24 | 75/25 | 85.4* | 3.60 (D) |

Note: "D" indicates the film tore prior to coating separation (destruct bond)
*: Dry laydown was limited due to high viscosity of resulting coating at low 5-sim levels.

The present invention having been thus described with particular reference to the preferred forms and embodiments thereof, it will be obvious that various changes and modifications may be made therein without departing from the spirit and scope of the invention as defined in the appended claims.

What is claimed is:

1. A coated polymer film comprising:
a self-supporting polymer film layer, and
a heat seal coating on said film layer, said heat seal coating consisting essentially of a copolyester formed of components including isophthalic acid, a sulfomonomer containing a sulfonate group attached to a dicarboxylic nucleus, and 1,3-propane diol.

2. The coated polymer film of claim 1, wherein said heat seal coating is transparent.

3. The coated polymer film of claim 1, wherein said film is transparent.

4. The coated polymer film of claim 1, wherein an intermediate coating or layer is interposed between said heat seal coating and said film layer.

5. The coated polymer film of claim 1, wherein said copolyester is formed of about 40 to about 98 mol percent isophthalic acid, about 2 to about 20 mol percent of a sodium salt of 5-sulfoisophthalic acid, and about 100 mol percent 1,3-propane diol.

6. The coated polymer film of claim 1, wherein said propane diol is present at about 10 mol percent or greater.

7. The polymer film of claim 1, wherein said polymer includes polyester.

8. The polymer film of claim 1, wherein said copolyester is present at about 1 to about 30 weight percent of the coating solution forming said heat seal coating.

9. The polymer film of claim 1, wherein said sulfomonomer is the sodium salt of 5-sulfoisophthalic acid.

10. The polymer film of claim 1, wherein said isophthalic acid and said sulfomonomer are present at about a 9:1 mol ratio.

11. The polymer film of claim 1, wherein a dispersion forming said heat seal coating has a solids level of about 0.01 to about 30 weight percent.

12. The polymer film of claim 1, wherein said heat seal coating has a coating thickness of about 0.02 microns to about 1 microns.

13. The polymer film of claim 1, wherein said heat seal coating has a coating thickness of about 0.2 microns to about 0.3 microns.

14. The polymer film of claim 1, wherein said copolyester is water dispersible.

15. The polymer film of claim 1, wherein said film forms a destruct bond with itself on heat treatment of about 110 to about 170 degrees Celsius for about 0.5 to about 10 seconds.

16. The coated polymer film of claim 1, wherein said copolyester is formed of components consisting essentially of isophthalic acid, a sulfomonomer containing a sulfonate group attached to a dicarboxylic nucleus, and 1,3-propane diol.

17. A process for preparing a heat sealable film, said process comprising:
coating a surface of a polymer film with a heat seal coating consisting essentially of a water-soluble copolyester binder, wherein said copolyester is formed of monomers including a 1,3-propane diol.

18. The method of claim 17, wherein said coating further comprises a sulphomonomer.

19. The process of claim 17, wherein said coating of said surface is accomplished by in-line coating.

20. A method of forming a seal, comprising:
placing a film having a heat seal coating thereon against a substrate, wherein said heat seal coating consists essentially of a 1,3-propane diol-based copolyester;
applying heat to said film.

21. The method of claim 20, wherein said substrate is a film.

22. The method of claim 20, wherein said substrate is another portion of said film.

23. The method of claim 20, wherein said substrate includes polystyrene.

24. The method of claim 20, wherein said heat is applied by direct contact with said film.

25. A method of laminating comprising the steps of
i) providing a self-supporting polymer film, which film has a coating thereon, wherein said coating consists essentially of a copolyester including a sulfomonomer and a 1,3-propane diol.
ii) extruding a molten resin onto said film.

* * * * *